Dec. 13, 1960

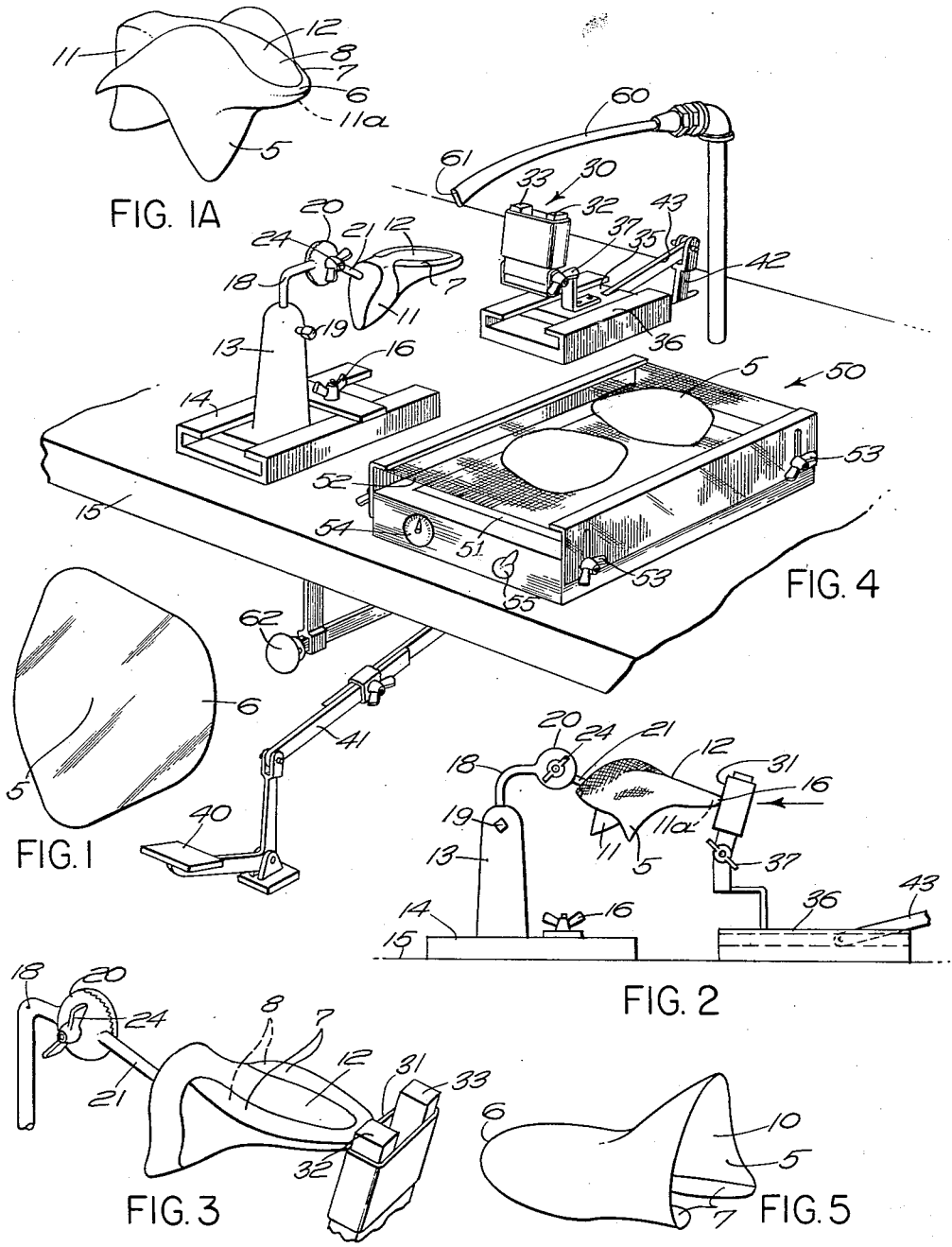

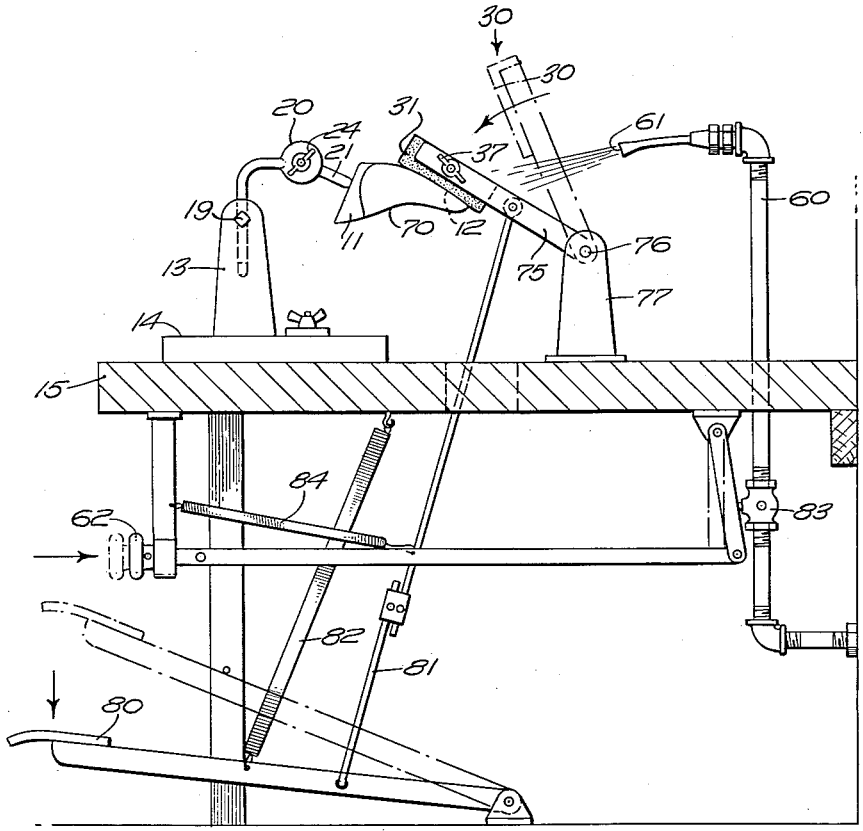
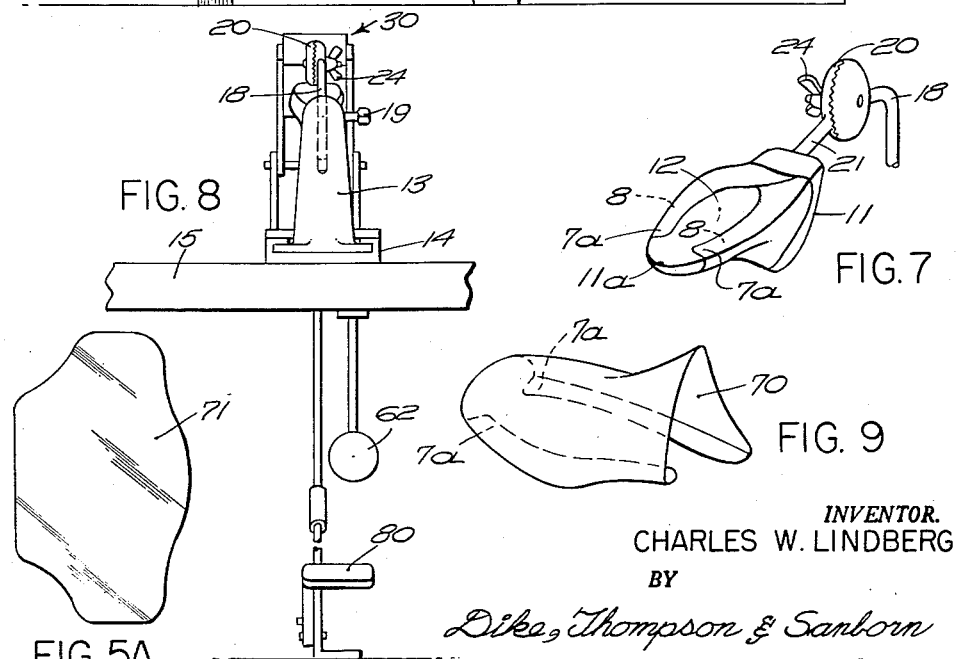

C. W. LINDBERG 2,963,745

METHOD FOR MAKING SHOE FORMS

Filed Oct. 23, 1956

INVENTOR.
CHARLES W. LINDBERG
BY
Dike, Thompson & Sanborn
ATTORNEYS

United States Patent Office 2,963,745
Patented Dec. 13, 1960

2,963,745
METHOD FOR MAKING SHOE FORMS

Charles W. Lindberg, Brockton, Mass., assignor to C. S. Pierce Company, Brockton, Mass., a corporation of Massachusetts Filed Oct. 23, 1956, Ser. No. 617,787

7 Claims. (Cl. 18—56)

This invention relates to manufacture of a shoe form for sales display purposes and the like, and to a method for making the shoe form, more particularly for molding the form on a last from a piece of thermoplastic sheet material.

Shoe forms for display purposes have been made in the past from a piece of wet pliable buckram or fiber mat in sheet form by a process in which the sheet is first soaked to make it pliable, then molded to shape and tacked over a wooden last to hold it in place and then baked in an oven to dry and harden the molded piece in the desired shape, after which the tacks are withdrawn and the form is stripped from the last.

The buckram and fiber forms have serious disadvantages. They tend to absorb moisture from the atmosphere, and in doing so they soften and go out of shape. When in the attempt to save manufacturing time, the sheets are not soaked long enough, they are not sufficiently pliable to conform to the last in the molding process and inaccurate shapes are produced. They have a somewhat rough appearance and finish, and tend to absorb dirt. They are not satisfactorily durable. For these reasons and because of the time consuming manufacturing process, they are too expensive.

Because of the disadvantages of the product and the time and expense of the previously known process, a quicker, better and less expensive process is highly desirable.

Accordingly, it is the object of the present invention to provide a process for making an inexpensive shoe form which is more durable, which has a more accurate shape and a cleaner and more finished appearance and to provide a quicker and less expensive process of making the shoe form.

In the drawings:

Fig. 1 is a plan view of a thermoplastic sheet for a full toe type form cut to shape, before molding.

Fig. 1A is a partial perspective of the last on the mechanism showing the first molding step.

Fig. 2 is a partial side elevation view of the mechanism including the last and showing the second molding step.

Fig. 3 is a partial perspective view of some of the parts showing the third molding step.

Fig. 4 is a perspective view of the mechanism showing the form on the last after molding.

Fig. 5 is a perspective view of the completed form of the full toe type made according to the invention.

Fig. 5A is a plan view of a thermoplastic sheet for a toe-less form cut to shape, before molding.

Fig. 6 is a side elevation view of a modified form of mechanism and showing a step in a modification of the molding process for making a toe-less shoe form.

Fig. 7 is a partial perspective of the last on the machine of Fig. 6 showing the molded toe-less form.

Fig. 8 is a partial front view of the machine of Fig. 6

Fig. 9 is a perspective view of the completed toe-less shoe form made according to the invention.

Figure 10:
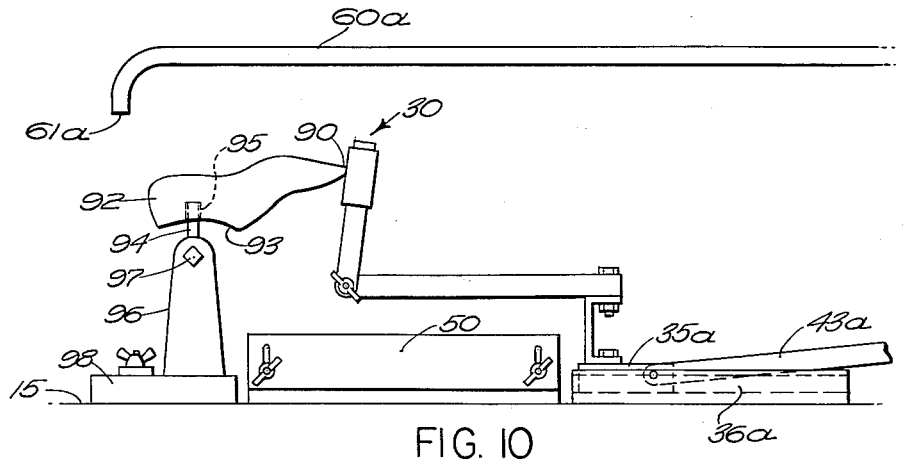
Fig. 10 is a side elevation view of a modification of the machine for making a full ankle type of form.

Referring to the drawings, Fig. 5 shows a shoe form 10 of the full toe type for sales display purposes and the like, made through practice of the invention from a piece of thermoplastic material 5 in sheet form cut to shape as seen in Fig. 1, preferably of vinyl plastic which is rigid at ordinary room temperatures, and which is capable of being transformed to a pliant moldable condition by heating, for instance by a radiant heater having a temperature of 600° to 650° F. Other forms of thermoplastic sheet material may also be used, such as butyrate acetate or straight acetate.

In Fig. 4 is shown the mechanism for use in carrying out the molding process for making the shoe form 10. It comprises a last 11 positioned with its bottom 12 upward, and supported by means including an upright 13 retained by suitable means such as a wing nut 16 in a fixed but adjustable position in a slideway 14 on a table 15. The upright 13 carries a right angle arm 18 positioned for up and down adjustment by a lock nut 19. The arm 18 has an adjustable joint 20 and an outward portion 21 to which the last 11 is attached, and by which the angularity of the last 11 with respect to the table 15 and other parts of the machine may be adjusted, as by the manipulation of a wing nut 24.

Figure 13:
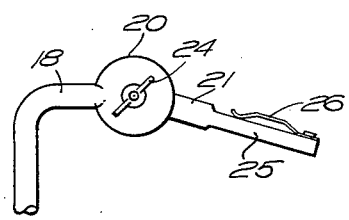
Fig. 13 is a side elevation view of the detail of the support for the last, with the last removed.
Figure 14:
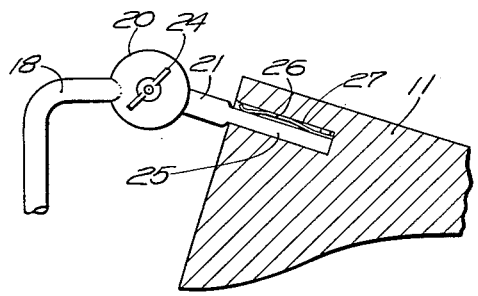
Fig. 14 is a side elevation view similar to Fig. 13 with the last in place on the support.

As seen in Figs. 13 and 14, the arm 21 has a flat portion 25, this being viewed from the side of its thin edge, and a compressable yieldable element 26 carried on the flat portion 25. As seen in Fig. 14, the flat portion 25 and the yieldable element 26 are adapted to be received in a correspondingly shaped hole 27 in the last 11 with the interior of the hole 27 pressing against the yieldable element 26 thereby frictionally retaining the last 11 on the arm 21 while allowing the last to be removed by the hand of the operator, with a force sufficient to overcome the friction. Lasts of various sizes and shapes are thus quickly interchangeable, and this arrangement also makes feasible the use of a number of identical interchangeable lasts for a particular production operation.

The mechanism also includes a resilient element indicated at 30 which in this embodiment includes a piece of rubber or other similar resilient sheet material 31 stretched across between a pair of uprights 32 and 33 supported on movable means including a slide 35 in a slideway 36, and angularly adjustable relative thereto by means of a wing nut 37. Actuating means including a foot pedal 40, a link 41, a pivoted arm 42 and a second link 43 are connected to the supporting slide 35 to move the resilient element 30 into contact with the last 11, in this case with the toe 11a of the last as seen in Fig. 2 to apply pressure against the last for a purpose to be described. The resilient element 30 is retracted away from the last 11, to the right as seen in Figs. 2, 3 and 4 by suitable means such as a spring (not shown) under the table 15 and connected to the link 41.

A heating mechanism indicated at 50 is adjacent the last 11, in this machine, on one side of it.

The heating mechanism 50 comprises a flat heating element 51 preferably in the form of a radiant heater for distributing heat evenly over a predetermined area, above which is positioned a flat screen 52 upon which may be supported one or more flat sheets 5 of thermoplastic material, for instance vinyl plastic for the purpose of applying heat simultaneously to the entire sheet by means of the heating element 51 so as to render the sheet pliant and moldable. The supporting screen 52 is adjustable up and down with respect to the heating element 51 by suitable means including wing nuts 53. A suitable indicating dial 54 and control knob 55 are provided for applying a predetermined degree of heat.

Means including an air line 60 having an open end 61 directed toward the last 11, are provided for applying a cooling agent, in this case a stream of air, against the last. The air line 60 is provided with suitable air supply means (not shown), such as a tank and pump, and is controlled by a knee operated push rod 62 and a valve actuated by the rod 62 as more particularly shown and to be described in connection with Fig. 6.

The operation of the machine of Fig. 4 and the practice of the method for making the shoe form 10 involve first setting up the machine by adjusting the position of the last 11 of any given size and shape and also adjusting the angularity and position of the resilient element 30 by manipulation of the adjustable parts as above described so that when the operator steps on the foot pedal 40 the resilient element 30 will be moved against the toe 11a of the last 11 as seen in Fig. 2, so that the toe portion 11a presses into the resilient element 30 to create a mechanical pressure exerted by the resilient sheet 31 around the general area of the toe 11a.

The heater 50 is adjusted as by manipulation of the wing nuts 53, the timer dial 54 and control knob 55 to provide a predetermined amount of heat sufficient to render pliable and moldable a sheet of thermoplastic material placed on the screen 52. The heater 50 may be set for the continuous application of heat, in which case the operator judges the amount of time necessary to render the plastic sheet moldable or the heater may include suitable alarm or shut-off means operating automatically in a well known manner either to warn the operator when the time cycle is completed or to shut off the heat.

It is to be understood that with vinyl plastic and other similar thermoplastic materials, the time during which the sheet remains pliable and moldable after the heat is withdrawn is very short and that therefore the molding operation has to be carried out very rapidly. The molding process described herein is mostly a hand forming process performed by the operator, but since the practical time limit for workable pliability and moldability of the plastic sheet is so short, one operator cannot conveniently perform the molding operation on a production basis without the aid of the machine.

With the machine set up as described, the operator places a sheet 5 of thermoplastic material on the supporting screen 52 of the heater 50 and sets the heating cycle in operation.

When the sheet 5 has been heated to a pliant moldable condition, the operator, who preferably wears gloves to protect his hands from the heat, picks up the sheet and places it with the toe portion 6 of the sheet 5 in contact with the toe 11a of the last 11 as seen in Fig. 1A. Then he steps on the foot pedal 40 which moves the resilient element 30 into contact with the toe 11a of the last 11, with the toe portion 6 of the sheet 5 in between thereby applying pressure against the sheet portion 6 to hold it in place on the last 11 and leaving the remainder of the sheet free. The operator then completes the shape of the shoe form 10 by pulling, stretching and working the free remainder of the sheet 5 smoothly around the last and forming a lip 7 over the bottom edge portion 8 of the last 11, as best seen in Fig. 3. While the molded shape is being held in place by the resilient element 30 and by the hands of the operator, the latter may then strike his knee against the push rod 62, opening the valve of the air line 60, emitting a cool stream of air against the warm molded shape thereby accelerating the cooling and setting process. When the form 10 has cooled and hardened to shape, it may be stripped by hand from the mold 11.

At a convenient time a new sheet 5 has been placed on the heater 50, and by the time the previous molded shape has been stripped, the new sheet has been heated and made pliable and moldable and is ready for a repetition of the molding process.

The entire molding process including the heating cycle takes about 20 to 25 seconds so that the production rate is very rapid compared to the older methods.

The advantage of the mechanism including the application of the resilient element 30 is that it enables the operator to form the beginning of the molded shape and then very quickly and conveniently to apply pressure to hold the sheet in place while he completes the shaping, stretching and pulling operation of the molding process without loss of time, without having to stop to drive tacks or staples as by the old process which because of the rapid cooling of the thermoplastic sheet would be too slow to allow the sheet to be molded. It has the further advantage that no tacks or other fastenings have to be withdrawn after the molding process, the shoe form is not pierced with holes, it eliminates the prior soaking step required in the earlier processes and the subsequent baking step while the shape is on the mold or last.

The method practiced with the machine makes it possible to use vinyl sheeting and the like which has desirable characteristics for shoe forms with respect to durability, low cost, appearance and smooth finish and it provides a rapid production cycle which is well adapted to the characteristics of the thermoplastic sheeting which can be quickly heated to a pliable condition and which at the same time must be rapidly molded into shape after the heating is withdrawn.

The same advantages are derived from the practice of a slightly modified process on a modification of the machine shown in Fig. 6 for making the toe-less type of shoe form 70 shown in Fig. 9 from the blank 71 shown in Fig. 5A.

Since this type of shoe form 70 has no toe like the toe portion 6 of the shoe form 10, as seen in Figs. 7, no part of the shoe form covers the toe 11a of the mold 11. Consequently, the pressure for retaining the plastic sheet 71 on the last 11 while being molded has to be applied on some other portion of the last.

As seen in Fig. 6 the last 11 and the parts supporting it are the same as those in the machine of Fig. 4. The resilient element 30 which may also have the same structural elements 31, 32 and 33 as those shown in Fig. 4 is, however, mounted on a movable support 75 which is pivoted at 76 on an upright 77 and moved into contact with the bottom 12 and particularly the bottom edge portions 8 of the last 11 by actuating means including a foot pedal 80 connected to the movable support 75 by a link 81 and urged upwardly to retract the resilient element 30 from the last 11 by suitable means such as a spring 82 connected between the foot pedal 80 and the table 15.

The push rod 62 is arranged to open the valve 83 and the air line 60 when knee pressure is exerted against it in the direction of the arrow, and may have suitable retraction means including a spring 84. The valve 83 and its associated means may be identical to the valve and actuating means for controlling the air stream on the machine of Fig. 4.

The machine of Fig. 6 has a heater (not shown) which is identical to the heater 50 in the machine of Fig. 4 and arranged in a similar manner. The operation of the machine of Fig. 6 for performing the process of making the shoe form 70 includes the same heating step shown and described in connection with the machine of Fig. 4. The sheet 71 is heated to a pliant moldable condition on the heater and then placed with a portion of the sheet in contact with a bottom edge portion of the last 11, for instance with the front portions of the lips 7a over the edge portions 8 of the last. Then the operator steps on the foot pedal 80 to bring the resilient element 30 downwardly against the bottom edge portion of the last and particularly against the front parts of the lips 7a which have first been placed on the last by the operator. Then the operator completes the shape of the shoe form 70 by pulling, stretching and working the remainder of the sheet 71 around the last 11 in substantially the same manner as in the formation of the shoe form 10. Then while holding the still pliable shoe form in place by maintaining pressure on the pedal 80 and with his hands, he strikes against the push rod 62 with his knee to cool and set the molded shoe form in the same manner as previously described. When the shoe form is cooled and set, the operator strips it from the last 11.

The production cycle on each of the above machines may be shortened by heating two plastic blanks at the same time in an overlapping time relationship while molding in a third blank. Generally speaking the time for the overall production cycle depends a good deal upon the heating time which in turn varies for an individual sheet of stock in accordance with the thickness of the stock being used. On these machines the heating cycle is about 1 second per .0001 inch of stock thickness. It appears preferable to use a stock thickness varying from .025 inch to .040 inch and therefore the heating cycle will vary from 25 to 40 seconds for an individual piece.

The actual forming or molding cycle, that is, the time elapsing between first placing the pliable blank in contact with the last until the shape is formed averages in production about 3.5 seconds. The cooling cycle with equipment shown averages about 6 seconds but may be made shorter with more efficient cooling equipment. When using the overlapping heating method, that is, heating two or more blanks at a time, one being placed on the heater after the other, the overall production cycle, once the production run has been started, may be brought down as low as 8 seconds or less for each finished piece.

Figure 11:
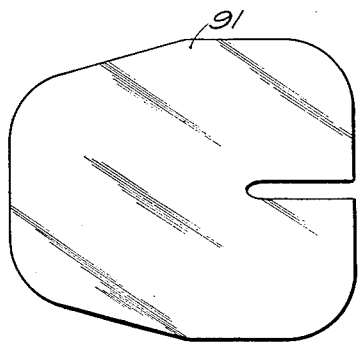
Fig. 11 is a plan view of a thermoplastic sheet for a full ankle type of form cut to shape, before molding.
Figure 12:
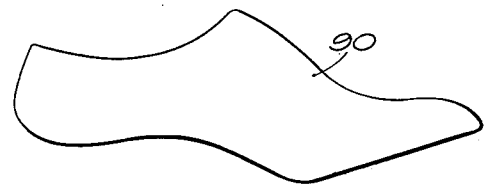
Fig. 12 is a side elevation view of a full ankle type of form made by a modified process of the invention on the machine of Fig. 10.

Fig. 10 shows another modification of the machine for making a full ankle type of form 90 seen in Fig. 12 from a blank 91 seen in Fig. 11. In this modification the last 92, not being covered by the thermoplastic sheet 91 at the top 93, is exposed for support by a vertical upright 94 which is received in a hole 95 in the last 92 and which is adjustably slidable up and down in the upright 96 as by the manipulation of a set screw 97 and which is slidably adjustable in a horizontal direction in ways 98. A resilient element 30 carried on the movable support 35a in ways 36a may be actuated by the link 43a and by foot pedal means (not shown) similar to the mechanisms shown in Fig. 4. In this embodiment, the heater 50 is positioned directly under the last 92.

In operation, the operator places the blank 91 over the toe 90 of the last 92, brings the resilient element 30 against the toe 90 to hold the blank 91 in place and by pulling and stretching the blank 91 over the last 92 partially shapes as much of the form as he can while the sheet remains moldable and pliable. Since this step takes place immediately above the heater the setting up of the sheet 91 is delayed in the presence of the heat, nevertheless, the hardening of the sheet 91 takes place so rapidly that the operator cannot complete the shape of the form in one step as was done in the fabrication of the forms 10 and 70 shown in Figs. 5 and 9.

The operator removes the last 92 from the upright 94 and by holding it in his hand and rolling it over and over down close to the surface of the heater 50 the unshaped parts of the form again become pliant as a result of the reheating, and the operator can then shape the remaining portions of the shoe form, preferably by holding the mold in one hand and performing the pulling and stretching operations on the remaining portions of the shoe with the other hand.

The operator can then complete the hardening and setting up process by holding the last under the nozzle 61a of the air line 60a which as seen in Fig. 10 is offset to a position convenient to manipulation of the operator and also away from the top of the heater 50 to prevent cooling of the heater.

For convenience, the air nozzle 61a or the heater 50 or both may be constructed to swing or to slide out of operating position or from one operating position to another as an aid to the operator in cutting down the elapsed time of the manufacturing cycle and to prevent interference between the stream of air from the nozzle 61a and the heater 50.

The shoe form made through practice of the invention has far better characteristics than previous plastic shoe forms such, for instance, as those formed of nitrate plastics and the like, and is much more quickly and cheaply made than such previous types because of the process which was necessarily involved. The thermoplastic material is non-inflammable whereas the nitrate and other types are highly flammable. No plasticizers or solvents are required in manufacture, whereas the use of nitrate and other type plastics in the manufacture of forms by the prior methods required that the material be soaked in solvents and plasticized into a workable condition, and after molding that it be put through a time consuming drying process. As time went on, the plasticizers or solvents gradually migrated from the material of the form, causing it to become weaker, more brittle and subject to fracture so that the form was not only expensive to make but also had a short useful life. These and the other above described disadvantages are overcome by the invention herein described.

I claim:

1. Method of making a plastic shoe form which comprises the first heating step irradiating a dry sheet of thermoplastic material with heat sufficiently to render said sheet pliant and moldable, placing a portion of one side of the pliant sheet near an edge thereof in contact with a last, applying pressure to the other side of said sheet at said portion thereof thereby holding said portion immovably in place on said last while the remainder is left free, then completing the shape of the form while said sheet retains heat and remain pliant by pulling the free portion of said sheet smoothly around the contour of the last and by stretching said sheet in direction away from said portion held on said last to fashion a smooth lip over the bottom edge portion of said last.

2. In the method as set forth in claim 1, the additional step of forcing cooling air against said form while maintaining said sheet stretched and until it has set sufficiently to retain its shape upon the last.

3. Method of making a plastic shoe form which comprises the first heating step of irradiating a dry sheet of thermoplastic material with heat sufficiently to render said sheet pliant and moldable, placing a portion of one side of the pliant sheet near an edge thereof in contact with the toe of a last, applying mechanical pressure to the other side of said sheet through a resilient element at said portion sufficient to hold said portion in place on said last while the remainder is left free, then completing the shape of the form while said sheet is pliant by pulling the free portion of said sheet smoothly around the last and by stretching said sheet in direction away from said portion held on said last to fashion a smooth lip over the bottom portion of the last.

4. Method of making a plastic shoe form which comprises the first heating step of irradiating a dry sheet of thermoplastic material with heat sufficiently to render said sheet pliant and moldable, placing a portion of one side of the sheet near an edge thereof in contact with a bottom edge portion of a last to form at least the beginning of a lip on the bottom edge of the last, applying mechanical pressure to the other side of said sheet at said portion to hold said portion in place on said last while the remainder is left free, then completing the shape of the form by pulling the free portion of said sheet smoothly around the last and by stretching said sheet in direction away from said portion held on said last to complete the fashioning of said lip smoothly over said bottom edge portion of said last.

5. Method of making a plastic shoe form which comprises the first heating step of irradiating a dry sheet of thermoplastic material with heat sufficiently to render said sheet pliant and moldable, placing a portion of one side of the sheet near an edge thereof in contact with a last, applying mechanical pressure to the other side of said sheet at said portion to hold said portion in place on said last while the remainder is left free, partially shaping the form by pulling, stretching and working part of the free portion of said sheet around said last to conform to the contour of said last and to fashion a lip over the bottom edge portion of said last, repeating the heating of said sheet while partially shaped around said last, and then shaping the form by pulling and stretching said sheet in direction away from said portion held on said last until the shoe form has been completely and smoothly pulled into shape around said last and a smooth lip has been formed over the bottom edge portion of said last.

6. Method of making a plastic form for footwear which comprises the first heating step of irradiating a dry sheet of thermoplastic material with heat sufficiently to render said sheet pliant and moldable, placing the sheet against a last with a portion of one side near an edge thereof contacting the front end of the toe of the last and with a portion projecting beyond the bottom of said last for fashioning a lip, applying mechanical pressure to the other side of said sheet opposite said contacting portion and thereby clamping said contacting portion immovably against the last while the remainder of the sheet is left free, and then completing the form by pulling the free portions of said sheet smoothly around the last and by stretching said sheet about the bottom edge of said last in direction rearwardly away from said toe of said last to produce a smooth lip including material from said projecting portion of said sheet.

7. Method of making a plastic form for footwear which comprises the first heating step of irradiating a flat dry sheet of thermoplastic material of predetermined shape with heat sufficiently to render said sheet pliant and moldable, placing the pliant moldable sheet against a last with a portion of one side near an edge thereof contacting the front end of the toe of said last and with a portion projecting beyond the bottom of said last for fashioning an inturned lip about the bottom edge portion of said last, applying mechanical pressure to the other side of same sheet through a resilient element at said contacting portion and thereby clamping said contacting portion immovably against said last while the remainder of the sheet is left free, then completing the form by pulling the free portions of said sheet smoothly around said last and by stretching said sheet in direction away from said projecting portion and about the bottom edge portion of said last to fashion a smooth inturned lip on the shoe form while said sheet remains pliant, and cooling said form while maintaining said sheet stretched about said last until it has set sufficiently to retain its shape around said last.

References Cited in the file of this patent

UNITED STATES PATENTS

| | | |
|---|---|---|
| 1,358,068 | Ferguson | Nov. 9, 1920 |
| 1,880,920 | Eddins et al. | Oct. 4, 1932 |
| 2,039,261 | Reinhardt | Apr. 28, 1936 |
| 2,087,195 | Reinhardt | July 13, 1937 |
| 2,521,246 | Newhouse | Sept. 5, 1950 |
| 2,638,633 | Root | May 19, 1953 |
| 2,770,010 | Doherty | Nov. 13, 1956 |

OTHER REFERENCES

Plastics Engineering Handbook (Society of the Plastics Industry), published by Reinhold Pub. Corp., New York, 1954 (pp. 151–153).

"New Vacuum Technique" (Greene), published in "Plastics," June 1944 (pages 22–25).